(12) United States Patent
Son et al.

(10) Patent No.: US 8,687,135 B2
(45) Date of Patent: Apr. 1, 2014

(54) STEREOSCOPIC LIQUID CRYSTAL DISPLAY DEVICE HAVING TOUCH PANEL AND METHOD FOR MANUFACTURING THE SAME

(75) Inventors: Jung-Eun Son, Seoul (KR); Joun-Ho Lee, Daegu (KR)

(73) Assignee: LG Display Co., Ltd., Seoul (KR)

( * ) Notice: Subject to any disclaimer, the term of this patent is extended or adjusted under 35 U.S.C. 154(b) by 713 days.

(21) Appl. No.: 12/942,717

(22) Filed: Nov. 9, 2010

(65) Prior Publication Data

US 2011/0109622 A1     May 12, 2011

(30) Foreign Application Priority Data

Nov. 12, 2009   (KR) .................. 10-2009-0109193

(51) Int. Cl.
*G02F 1/1333*     (2006.01)

(52) U.S. Cl.
USPC ............. 349/40; 349/12; 349/15; 349/139; 349/187

(58) Field of Classification Search
USPC ........... 349/12, 15, 122, 106, 139, 158, 143, 349/40, 187, 419; 345/419
See application file for complete search history.

(56) References Cited

U.S. PATENT DOCUMENTS

| | | | | |
|---|---|---|---|---|
| 7,602,451 B2 * | 10/2009 | Hinata | ............................ | 349/12 |
| 7,663,726 B2 * | 2/2010 | Takahashi et al. | ............ | 349/150 |
| 8,031,273 B2 * | 10/2011 | Yabuta et al. | ................... | 349/12 |
| 2008/0151167 A1 | 6/2008 | Aota et al. | | |
| 2009/0122210 A1 | 5/2009 | Im | | |
| 2009/0262096 A1 | 10/2009 | Teramoto | | |

FOREIGN PATENT DOCUMENTS

| | | |
|---|---|---|
| CN | 101211050 A | 7/2008 |
| CN | 101299103 A | 11/2008 |
| CN | 101419352 A | 4/2009 |
| CN | 101566750 A | 10/2009 |

OTHER PUBLICATIONS

Office Action issued in related Chinese Patent Application No. 201010277036.3 dated Nov. 5, 2012.
Office Action issued in related Chinese Patent Application No. 201010277036.6 dated Jul. 11, 2013.

* cited by examiner

*Primary Examiner* — Thoi Duong
(74) *Attorney, Agent, or Firm* — Morgan, Lewis & Bockius LLP

(57) ABSTRACT

A stereoscopic liquid crystal display device having a touch panel and a method for manufacturing the same, wherein a stable touch detection can be performed without influencing the operation of a neighboring display panel or an electrically-driven liquid crystal lens, are disclosed.

9 Claims, 5 Drawing Sheets

STEREOSCOPIC LIQUID CRYSTAL DISPLAY DEVICE HAVING TOUCH PANEL AND METHOD FOR MANUFACTURING THE SAME

This application claims the benefit of the Korean Patent Application No. 10-2009-0109193, filed on Nov. 12, 2009, which is hereby incorporated by reference as if fully set forth herein.

BACKGROUND OF THE INVENTION

1. Field of the Invention

The present invention relates to a liquid crystal display device and, more particularly, to a stereoscopic liquid crystal display device having a touch panel and a method for manufacturing the same, wherein a stable touch detection can be performed without influencing the operation of a neighboring display panel or an electrically-driven liquid crystal lens.

2. Discussion of the Related Art

Recently, as the world has reached a full-scale information age, the field of display that can visually express electric information signals has developed at a vast rate. And, in order to meet with the requirements of such development, various types of flat display devices having excellent functions and characteristics, such as compact size, light weight, low power consumption rate, and so on, have been developed so replace the cathode ray tube (CRT) displays.

Detailed examples of such flat display devices may include liquid crystal display (LCD) devices, plasma display panel (PDP) devices, field emission display (FED) devices, electro-luminescence display (ELD) devices, and so on. More specifically, these flat display devices commonly include a flat display panel realizing images as an essential element. Herein, a flat display device has the structure of a pair of transparent insulation layers bonded so as to face into each other between unique light-emitting or polarization material layers.

Herein, the liquid crystal display device uses an electric field to adjust light transmissivity of the liquid crystals, thereby display an image. In order to do so, an image display device consists of a display panel having liquid crystal cells, and a driving circuit for driving a backlight unit and the liquid crystal cells, wherein the backlight unit emits light rays to the display panel.

The display panel is configured so that a plurality of gate lines and a plurality of data lines crossover one another, so as to define a plurality of unit pixel regions. At this point, each pixel region is provided with a thin film transistor array substrate and a color filter array substrate facing into each other, a spacer maintaining a predetermined cell gap between the thin film transistor array substrate and the color filter array substrate, and liquid crystal filling the cell gap.

A thin film transistor array substrate consists of gate lines and data lines, a thin film transistor formed as a switching device at each crossing point between the gate lines and the data lines, pixel electrodes formed in liquid crystal cell units and connected to the thin film transistor, and an alignment layer deposited thereon. Each of the gate lines and the data lines receives a signal from driving circuits through a pad unit.

The thin film transistor responds to a scan signal supplied to the gate line, so as to a supply pixel voltage signal, which is supplied to the data line, to the pixel electrode.

The color filter array substrate consists of color filters formed in liquid crystal cell units, a black matrix for identifying the color filters and for reflecting external light, common electrodes commonly supplying reference voltage to the liquid crystal cells, and an alignment layer deposited thereon.

Thereafter, the thin film transistor array substrate and the color filter array substrate that are separately configured, as described above, are aligned and bonded so as to face into each other. Subsequently, liquid crystal is injected between the two substrates, which are then sealed.

Recently, demands for adding a touch panel to the liquid crystal display device having the above-described structure have been increasing. Herein, the touch panel may recognize specific portions touched by the hand of the user or by a separate input means and may transmit separate information with respect to recognized portion of the screen (or panel).

Additionally, apart from the touch panel, the liquid crystal display device is also separately provided with a lenticular lens for displaying stereoscopic images.

Hereinafter, the related art stereoscopic liquid crystal display device having a touch panel fixed thereto will now be described in detail with reference to the accompanying drawings.

FIG. 1 illustrates a cross-sectional view showing a liquid crystal display device having a general touch panel fixed thereto.

Referring to FIG. 1, the liquid crystal display device having a general touch panel fixed thereto is sequentially provided with a liquid crystal panel 1, and a touch panel layer 50. The liquid crystal display device is also provided with an adhesion layer 45 between the interface.

Herein, the adhesion layer 45 corresponds to a double-sided adhesion layer adhering (or bonding) the liquid crystal layer panel 1 to the touch panel layer 50.

Also, the liquid crystal panel 1 includes a first substrate 10 and a second substrate 20 facing into each other, a liquid crystal layer 30 filling the space between the first substrate 10 and the second substrate 20, a color filter layer 21 (21a, 21b, and 21c) formed on each surface of the second substrate 20 touching (or contacting) the liquid crystal layer 30, and a common electrode 22 formed on an entire surface of the color filter layer 21. Although it is not shown in the drawing, a first polarizing layer and a second polarizing layer may be further included on each rear surface of the first substrate 10 and the second substrate 20.

Also, the touch panel 50 is separately provided with an adhesion layer 45 on the liquid crystal panel 1, wherein the adhesion layer 45 is placed between the touch panel 50 and the liquid crystal panel 1. Herein, the inner structure may vary in diverse formats depending upon the operation (or driving) method.

For example, the touch panel 50 may be divided into a resistive type and a capacitive type. And, in this case, a patterned transparent electrode is formed inside of the touch panel 50.

Firstly, a resistive touch panel essentially consists of conductive transparent electrodes facing into one another. The gap (or space) between the transparent electrodes facing into one another maintains a predetermined distance by a finely printed spacer, thereby being electrically insulated. When a constant voltage is applied to each transparent electrode, and when the upper substrate is touched by the hand of a user or by a touch-pen, a change in resistance occurs in each of the upper substrate (X-axis) and the lower substrate (Y-axis) in accordance with the touched position. At this point, the resistive touch panel uses a controller to calculate the position of the upper substrate (X-axis) and the lower substrate (Y-axis) where the change in the resistance value has occurred, thereby displaying the corresponding coordinates on the monitor or inputting the data.

The capacitive touch panel is provided with a detection electrode of a transparent electrode component and a signal applying electrode, wherein a change in voltage caused by a fine current flow is sensed at a touched point, thereby detecting whether or not and where a touch has occurred.

Therefore, when the above-described resistive or capacitive touch panel is positioned on the liquid crystal panel, a parasitic capacitance may occur between a transparent electrode within the touch panel and a common electrode of the liquid crystal panel. Such parasitic capacitance may be applied as a noise for sensing a touch.

In order to block (or prevent) such noise, a structure of forming a rear electrode of a transparent electrode component on a rear surface side of the liquid crystal panel has been proposed.

FIG. 2a shows an example of a signal measuring method in a stereoscopic liquid crystal display device having a touch panel. And, FIG. 2b and FIG. 2c illustrates wave forms showing noise generation, in a related art stereoscopic liquid crystal display device having a general touch panel.

FIG. 2a shows an example wherein a rear electrode of a transparent electrode component is formed on a polarizing layer above the liquid crystal panel (not shown) and set to a floating state, and wherein an electrode 62 of the touch panel is then placed above the rear electrode 61.

Herein, a substrate of the touch panel, which functions as an insulating layer, has been omitted in the drawing. Also, the electrode 62 of the touch panel corresponds to an electrode patterned to a predetermined form.

At this point, when measuring a signal generated from the electrode 62 of the touch panel, a section having an bouncing signal value at a specific point occurs even when a touch has not occurred, as shown in FIG. 2b and FIG. 2c. The signals bouncing at a specific point are referred to as noise, and the cause of such bouncing of the signals (or noise) is known as an influence of a gate clock signal being applied to the liquid crystal panel.

Therefore, in a structure fixing a touch panel on a liquid crystal panel provided with a rear electrode, since it is not yet possible to completely and fully prevent a parasitic capacitance or noise caused by the liquid crystal panel from occurring, efforts are being made in order to implement a solution to such problems.

As described above, the related art liquid crystal display device having a touch panel fixed thereto has the following disadvantages.

For example, in case of a capacitive or resistive touch panel, a parasitic capacitance may occur between a transparent electrode provided in the touch panel and a common electrode provided in the liquid crystal panel, and such parasitic capacitance may be recognized as noise, thereby causing a malfunction in the touch detection.

Also, even when a rear electrode is provided on a rear surface side of a liquid crystal panel in order to block (or prevent) any influence caused by the liquid crystal panel, a noise may occur in a specific section even when no touch has occurred. And, in case the touch panel is positioned above the liquid crystal panel, there may be difficulty in that the touch panel cannot fully and completely block (or prevent) influence caused by the liquid crystal panel.

Furthermore, apart from the touch panel on liquid crystal display for realizing 3D display, in case of a display device being separately provided with a lens layer having a lens function for displaying stereoscopic images in order to implement 3D display, a shape-forming process for forming each lens layer and a bonding process for bonding the lens layer having a curved surface are performed. Thus, increasing the fabrication (or manufacturing) cost for forming the display device having complex functions.

SUMMARY OF THE INVENTION

Accordingly, the present invention is directed to a stereoscopic liquid crystal display device having a touch panel and a method for manufacturing the same that substantially obviate one or more problems due to limitations and disadvantages of the related art.

Another object of the present invention is to provide a stereoscopic liquid crystal display device having a touch panel and a method for manufacturing the same that can stably detect a touch without any influence from a neighboring display panel or an operation of an electrically-driven liquid crystal lens.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic liquid crystal display device includes a liquid crystal panel configured by including a first substrate and a second substrate facing into each other, and a first liquid crystal layer filling a space between the first substrate and the second substrate, a first adhesion layer formed on the second substrate of the liquid crystal panel, and an electrically-driven liquid crystal lens including a third substrate and a fourth substrate facing into each other and formed on the first adhesion layer, a second liquid crystal layer formed between the third substrate and the fourth substrate, a plurality of first electrodes formed on the third substrate, and a second electrode formed on an entire surface of a surface of the fourth substrate facing into the second liquid crystal layer and being grounded, a second adhesion layer formed on a fourth substrate of the electrically-driven liquid crystal lens, and a touch panel including a fifth substrate of the second adhesion layer, and a first touch electrode and a second touch electrode formed on the fifth substrate, wherein the first touch electrode and the second touch electrode cross over one another.

Herein, the stereoscopic liquid crystal display device may further include a rear electrode formed on a surface of the second substrate contacting the first adhesion layer.

Also, it is preferable that the rear electrode, the first electrodes, the second electrode, the first touch electrode, and the second touch electrode are each formed of a transparent electrode. At this point, the rear electrode may be grounded.

A power voltage of 0V may be applied to the second electrode.

Herein, different voltages may be applied to the first electrodes within a predetermined pitch, so as to drive the electrically-driven liquid crystal lens with a lens, thereby performing a 3D display. And, the first electrodes may be floated or applied with the same power voltage or phase voltage, thereby performing a 2D display.

Alternatively, the second electrode may contact a structure enveloping and encasing the liquid crystal panel, the electrically-driven liquid crystal lens, and the touch panel, thereby being grounded.

In another aspect of the present invention, a method of manufacturing a stereoscopic liquid crystal display device includes preparing a liquid crystal panel configured by including a first substrate and a second substrate facing into each other, and a first liquid crystal layer filling a space between the first substrate and the second substrate, preparing an electrically-driven liquid crystal lens including a third substrate and a fourth substrate facing into each other and formed on the first adhesion layer, a second liquid crystal layer formed between the third substrate and the fourth substrate, a plurality of first electrodes formed on the third substrate, and a second electrode formed on an entire surface of a surface of the fourth substrate facing into the second liquid crystal layer, bonding the second substrate of the liquid crystal panel and the third substrate of the electrically-driven liquid crystal lens with a first adhesion layer positioned between the second substrate and the third substrate, preparing a touch panel including a fifth substrate, and a first touch electrode and a second touch electrode on the fifth substrate, wherein the first touch electrode and the second touch electrode cross over one another, bonding the fourth substrate and the fifth substrate of the electrically-driven liquid crystal lens with a second adhesion layer positioned between the fourth substrate and the fifth substrate, and grounding the second adhesion layer.

Herein, the method of manufacturing a stereoscopic liquid crystal display device may further include forming a cover glass on the touch panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, the stereoscopic liquid crystal display device having a touch panel and a method of manufacturing the same will now be described in detail with reference to the accompanying drawings.

Figure 1:
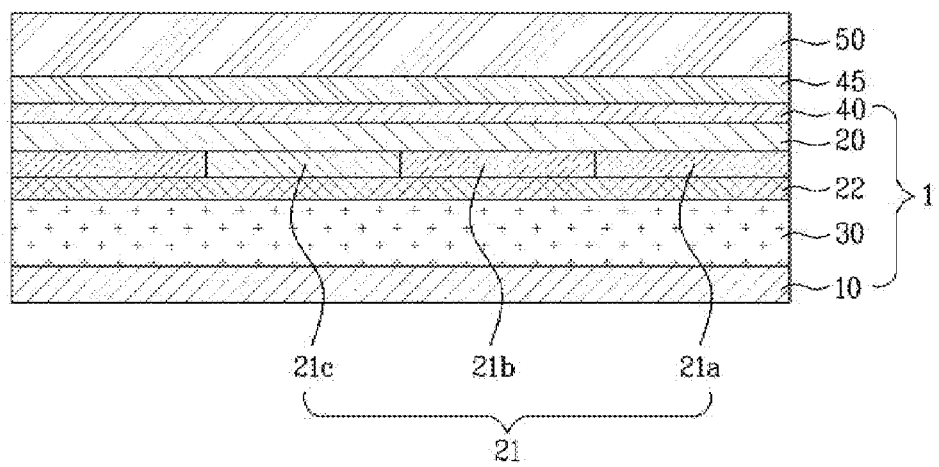
FIG. 1 illustrates a cross-sectional view showing a liquid crystal display device having a general touch panel fixed thereto.
Figure 2A:
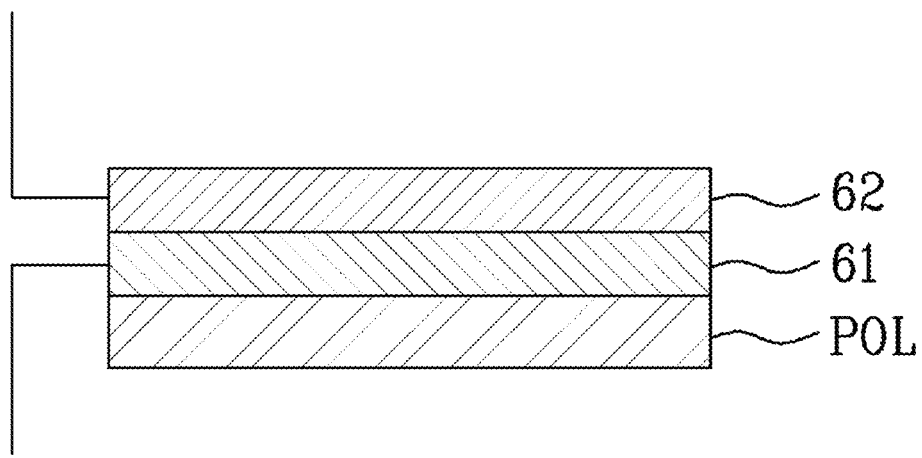
FIG. 2a shows an example of a signal measuring method in a stereoscopic liquid crystal display device having a touch panel.
Figure 2B:
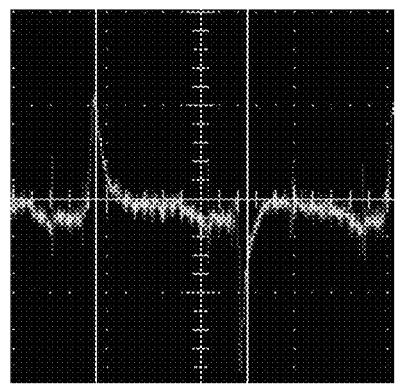
FIG. 2b and FIG. 2c illustrates wave forms showing noise generation, in a related art stereoscopic liquid crystal display device having a general touch panel.
Figure 2C:
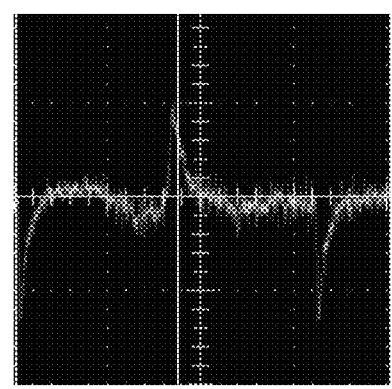
Figure 3:
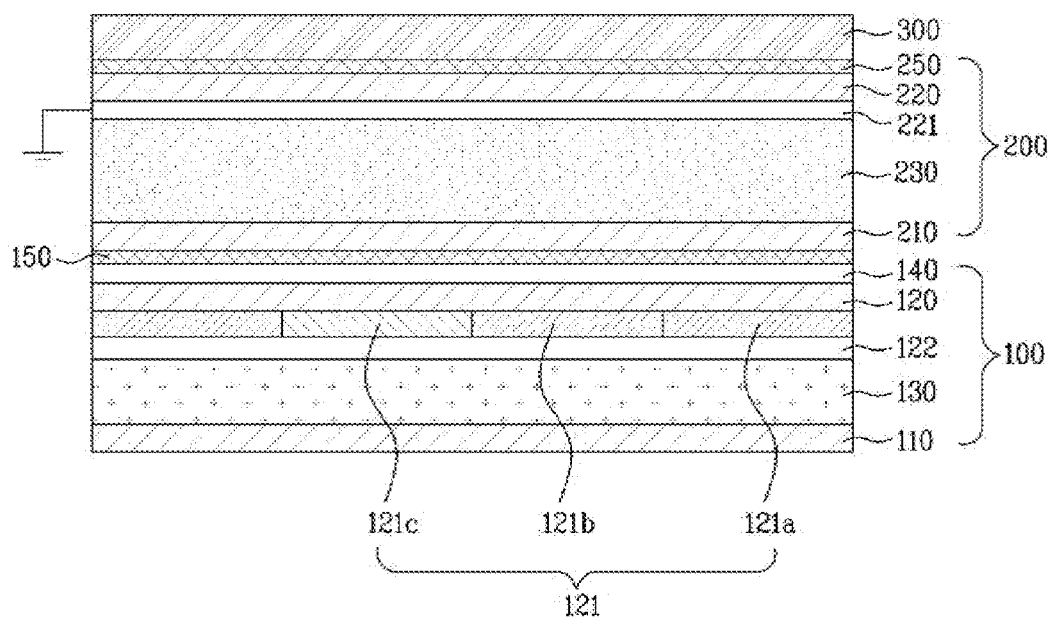
FIG. 3 illustrates a general cross-sectional view of a stereoscopic liquid crystal display device having a touch panel according to the present invention.

FIG. 3 illustrates a general cross-sectional view of a stereoscopic liquid crystal display device having a touch panel according to the present invention.

Referring to FIG. 3, the stereoscopic liquid crystal display device having a touch panel according to the present invention consists of a liquid crystal panel 100 including a first substrate 110 and a second substrate 120 facing into each other and first liquid crystal layer 130 filling a space between the first substrate 110 and the second substrate 120, an electrically-driven liquid crystal lens 200 including a first adhesion layer 150 formed on the second substrate 120 of the liquid crystal panel 100, a third substrate 210 and a fourth substrate 220 formed on the first adhesion layer 150 and facing into each other, a second liquid crystal layer 230 formed between the third substrate 210 and the fourth substrate 220, a plurality of first electrodes (see 211 of FIG. 4) formed on the third substrate 210, and a second electrode 221 formed on an entire surface facing into the second liquid crystal layer 230 of the fourth substrate 220 and grounded, a second adhesion layer 250 formed on the fourth substrate of the electrically-driven liquid crystal lens 200, and a touch panel 300 formed on the second adhesion layer 250.

Herein, although it is not shown in the drawing, the first substrate 110 is provided with a thin film transistor provided for each pixel for driving the pixels, and a pixel electrode connected to the thin film transistor.

Also, the second substrate 120 is provided with a block matrix (not shown) corresponding to a non-pixel region, first to third color filter layers 121 (121a, 121b, and 121c) corresponding at least to the pixels, and a common electrode 122 formed on the entire surface of the black matrix layer and the color filter layer 121. Additionally, during the process of forming the liquid crystal panel 100 on a rear surface side of the second substrate 120, in order to prevent any influence of the liquid crystal panel 100 caused by static electricity, a rear electrode 140 of a transparent electrode component may be further included.

In this case, if the rear electrode 140 is in a floating state during the process, a bonding is performed with the electrically-driven liquid crystal lens 200, thereby grounding the rear electrode 140 or applying a voltage of 0V. This is to prevent any malfunction in the touch panel 300 or the electrically-driven liquid crystal lens 200 caused by voltage application being applied to the liquid crystal panel 100 positioned below the electrically-driven liquid crystal lens 200 or the touch panel 300.

Even if an AC voltage is applied to the common electrode 122 on the second substrate 120, influence from the AC voltage is shielded to the touch panel 300 or electrically-driven liquid crystal lens 200 by the rear electrode 140 and grounding itself.

Additionally, in the electrically-driven liquid crystal lens 200, the second electrode 221 is formed on an entire surface, and a vertical electric field is created between the second electrode 221 and the first electrodes formed on the third substrate 210, which faces into the second electrode 221, thereby realizing the electrically-driven liquid crystal lens with a difference in light pattern occurring in the second liquid crystal layer 230. In this case, different voltages are applied to the first electrodes located within a predetermined pitch, thereby forming a potential surface so that the potential surface within a pitch is formed in a direction intersecting a surface of the lens that is to be realized.

Meanwhile, the present invention is not always limited to use the above-described liquid crystal panel 100. In other words, other types of display panels may also be used herein. For example, an organic light-emitting diode display device or a plasma display panel (PDP) may be considered as alternatives for the liquid crystal panel.

Hereinafter, the stereoscopic liquid crystal display device having a touch panel according to the present invention will now be described in detail with reference to FIG. 4.

Figure 4:
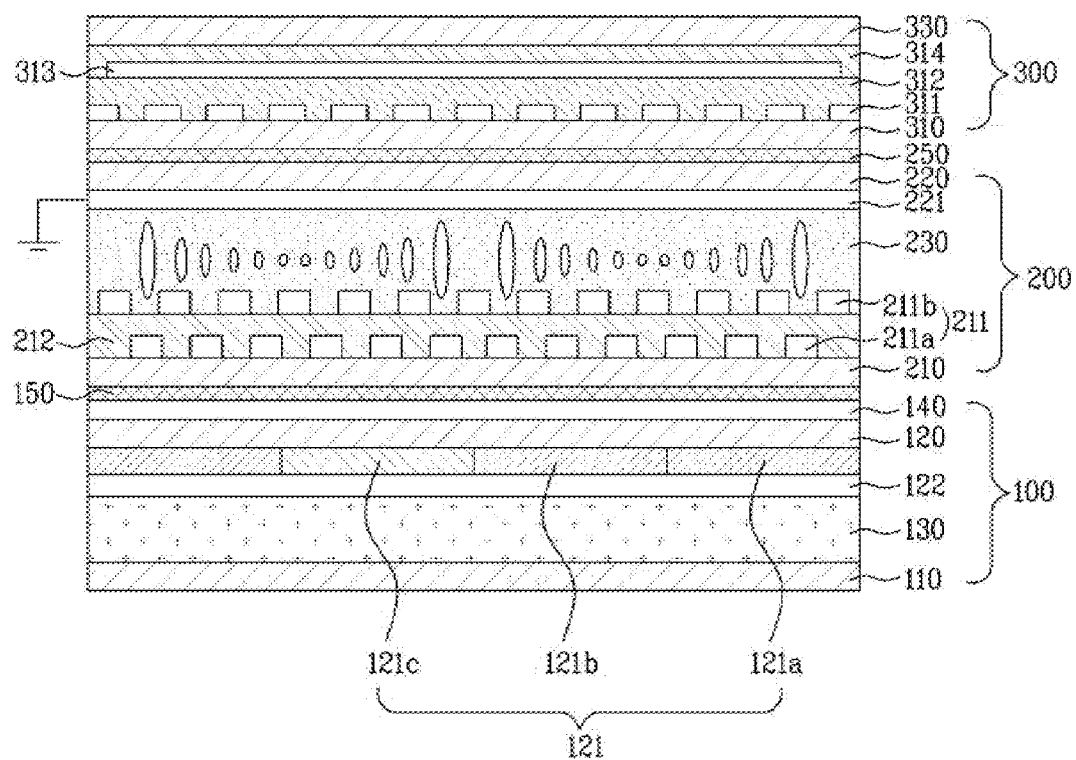
FIG. 4 illustrates a detailed general cross-sectional view of the stereoscopic liquid crystal display device having a touch panel according to the present invention.

FIG. 4 illustrates a detailed general cross-sectional view of the stereoscopic liquid crystal display device having a touch panel according to the present invention.

Herein, the elements of the liquid crystal panel 100 are identical to those described in FIG. 3. Therefore, detailed description of the same will be omitted for simplicity.

The electrically-driven liquid crystal lens 200 consists of a third substrate 210 and a fourth substrate 220 facing into each other, a plurality of first electrodes formed on the third substrate 210, a second electrode 221 formed on an entire surface of the fourth substrate 220, and a second liquid crystal layer 230 formed between the third substrate 210 and the fourth substrate 220.

Herein, as shown in FIG. 4, the first electrodes 211 may be placed at different layers, or, in some case, the first electrodes may be finely aligned on a single layer. As shown in FIG. 4, the first electrodes 211*a* of a first group may be formed to be spaced apart from one another on the third substrate 210. Then, an insulating layer 212 may be formed above the first electrodes 211*a* of the first group. Thereafter, the first electrodes 211*b* of a second group may be formed on portions of the insulating layer 212 where the first electrodes 211*a* of the first group are not formed. In this case, the lens surface of the electrically-driven liquid crystal lens may be formed to be smooth.

Herein, the first electrodes 211*a* of the first group and the first electrodes 211*b* of the second group are formed in the form of long bars along a cross-sectional direction of the drawing.

Also, the electrically-driven liquid crystal lens 200 defines a lens region by including at least the plurality of first electrodes 211. Herein, a plurality of lens regions may be defined.

More specifically, the electrically-driven liquid crystal lens 200 is provided with a plurality of first electrodes 211 for each pitch of the lens. And, for each pitch, the alignment of the first electrodes is repeated in the same format. The voltage starting from a center pitch to the edge of the lens is gradually increased and applied to the first electrodes 211, and the second electrode 220 is grounded, thereby creating a parabolic potential surface within the second liquid crystal layer 230. Thus, a lens effect may be optically obtained. When the starting from the center pitch to the edge of the lens is gradually increased, a parabolic lens having a curvature increasing from the center pitch to the edge (i.e., the height of the lens being the highest at the center, and the height of the lens being the lowest) may be obtained. As described above, when applying voltage to the first electrodes 211 and the second electrode 220, an electrically-driven liquid crystal lens is formed on the second liquid crystal layer 230, so as to output the image being outputted from the liquid crystal panel 100 as a left-view image and a right-view image, thereby enabling the user to visually sense a stereoscopic image.

A pitch (P) refers to a horizontal width of a lens region created on the touch and stereoscopic image lens layer 200. Herein, the lens regions do not have a physical lens form, such as the shown convex lens.

At this point, the first electrodes 211 are divided into a type of fine electrodes, and the number of fine electrodes may be adjusted depending upon the supplied amount of voltages. And, as the number of fine electrodes for each pitch increases, the curvature of the lens may become smoother. Also, the first electrodes 211 may be formed to have the same width and to be spaced apart from one another at a same distance. In some cases, the lens may be formed by gradually increasing or decreasing the width and intervals of the electrodes starting from the center to the edge.

Additionally, as shown in the drawing, the first electrodes 211 may be formed in different layers, may be provided with a plurality of interlayer dielectric films, and may be divided into two or more layers. Also, the electrodes may be spaced apart from one another on the same layer. The required curvature of the lens may be taken into consideration so as to determine the number of interlayer dielectric films and intervals (or distance), at which the interlayer dielectric films are spaced apart from one another.

More specifically, when applying different voltages to the first electrodes 211, and when driving the first electrodes 211 supplied with different voltages to the electrically-driven liquid crystal lens, an image projected to the liquid crystal panel 100 may be displayed as a stereoscopic (or 3D) image.

Meanwhile, when the second electrode 220 is grounded, and when 0V voltage is applied to all of the first electrodes, or when the first electrodes are grounded, the second liquid crystal layer 230 acts as a simple transparent layer directly displaying the image outputted from the liquid crystal panel 100 without any refraction of the image. Therefore, the image of the liquid crystal panel 100 is directly provided to the user without any distinction in the field of vision. Thus, the user recognizes the outputted image as a 2D image.

The touch panel 300 consists of a fifth substrate 310, and a first touch electrode 311 and a second touch electrode 313 crossing over one another on the fifth substrate 310.

For example, the first touch electrode 311 may be formed in the form of a bar along the direction of the X-axis, and the second touch electrode 313 may be formed in the form of a bar along the direction of the Y-axis. And, in some cases, both the first and second touch electrodes 311 and 313 may be formed in the form of a diamond and connected to one another in a bridge format, so as to form the same layer. Then, only a portion of the touch electrodes may be formed between a metal formed below the contacting area and the insulating layer. The illustrated example shows the first touch electrode 311 and the second touch electrode 313 all being formed in the form of bars.

In this case, the first touch electrode 311 and the second touch electrode 313 all corresponds to transparent electrode components, and a first interlayer dielectric film is formed between the first touch electrode 311 and the second touch electrode 313.

Also, after forming a second interlayer dielectric film on the second touch electrode 313, a cover glass for protecting the first and second touch electrodes 311 and 313 may be further included.

The operation method of the touch panel 300 is not limited only to the method shown in the above-described example. In other words, the touch panel 300 may also be formed as a resistive touch panel, wherein transparent electrodes are formed on each of the two substrates facing into each other, or the touch panel 300 may also be formed in other type forms.

Herein, the touch detection of the touch panel 300 may be performed as described below.

First of all, when a driving voltage is applied to the first touch electrode 311, and when a touch occurred while measuring a detection voltage of the second touch electrode 313, a change in the detection voltage may be detected.

Meanwhile, it is preferable that the rear electrode 140, the first electrodes 211, the second electrode 221, the first touch electrode 311, and the second touch electrode 313 are formed of transparent electrodes. For example, the electrodes may be formed of transparent electrodes, such as indium tin oxide (ITO), indium zinc oxide (IZO), or indium tin-zinc oxide (ITZO), thereby preventing a decrease in aperture ratio and penetration ratio.

As described above, in the electrically-driven liquid crystal lens, by applying different voltages to the first electrodes 211 within a predetermined pitch, the electrically-driven liquid crystal lens may be operated as the lens so as to display 3D images. And, by floating the first electrodes 211 or by applying the same power voltage or phase voltage to the first electrodes 211, the display mode may be converted to the mode for displaying 2D images.

It is preferable that the second electrode 221 contacts a casing structure (not shown) enveloping the side portions of the liquid crystal panel 100, the electrically-driven liquid crystal lens 200, and the touch panel 300, and that the second electrode 221 is grounded.

The method for manufacturing the stereoscopic liquid crystal display device having a touch panel according to the present invention will now be described in detail.

More specifically, a liquid crystal panel is prepared. Herein, the liquid crystal panel includes a first substrate and a second substrate facing into each other, and a first liquid crystal layer filling a space between the first and second substrates is prepared.

Subsequently, an electrically-driven liquid crystal lens is prepared. Herein, the electrically-driven liquid crystal lens includes a third substrate and a fourth substrate formed on the first adhesion layer and facing into each other, a second liquid crystal layer formed between the third substrate and the fourth substrate, a plurality of first electrodes formed on the third substrate, and a second electrode formed on an entire surface facing into a surface of the second liquid crystal layer of the fourth substrate.

Thereafter, a first adhesion layer placed between the second substrate of the liquid crystal panel and the third substrate of the electrically-driven liquid crystal lens, is used to bond the second substrate and the third substrate.

Then, a touch panel is prepared, wherein the touch panel includes a fifth panel, and a first touch electrode and a second touch electrode crossing over one another.

Afterwards, a second adhesion layer is placed between the fourth substrate of the electrically-driven liquid crystal lens and the fifth substrate, so as to bond the fourth substrate and the fifth substrate.

Finally, the second electrode is grounded.

Figure 5:
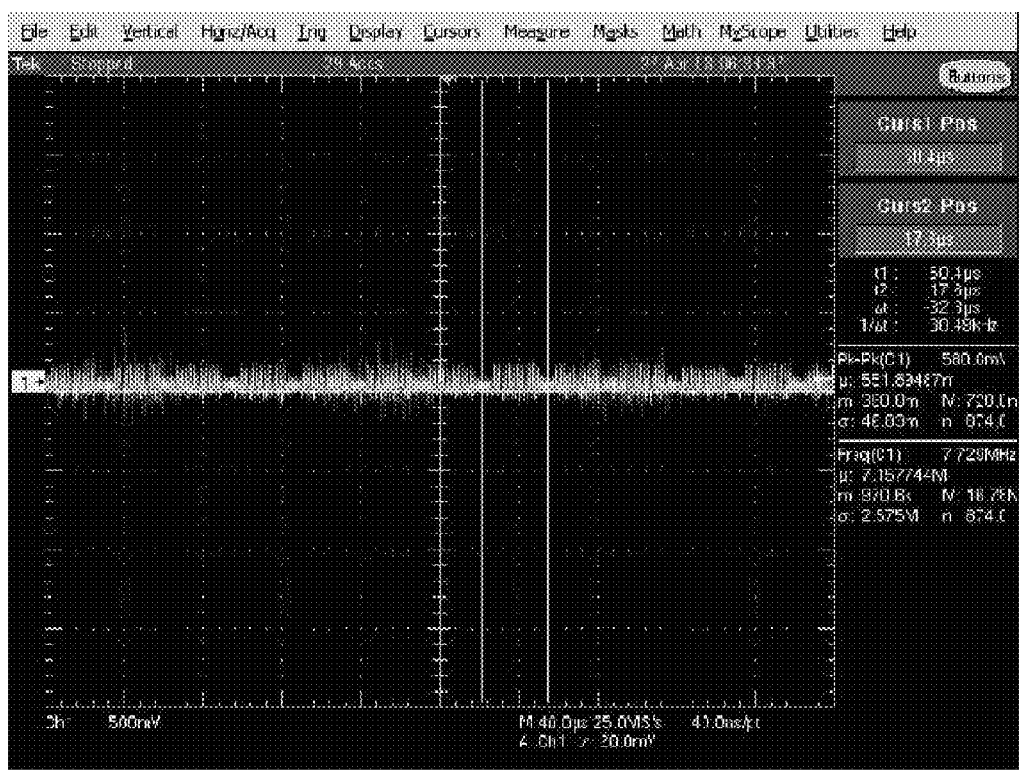
FIG. 5 illustrates a wave form when driving the stereoscopic liquid crystal display device having a touch panel according to the present invention.

FIG. 5 illustrates a wave form when driving the stereoscopic liquid crystal display device having a touch panel according to the present invention.

As shown in FIG. 5, when applying the stereoscopic liquid crystal display device having a touch panel according to the present invention, by applying a 0V voltage to the second electrode 221 of the electrically-driven liquid crystal lens 200, or by grounding the second electrode 221 of the electrically-driven liquid crystal lens 200, the noise occurring from the liquid crystal panel 100 along with the realization of the electrically-driven liquid crystal lens 200 is blocked (or prevented). Thus, an electrical shielding effect preventing the touch panel from being influenced may be gained. Therefore, as shown in FIG. 5, when there is no touch, a signal may be stably detected in a specific section without any bouncing.

Accordingly, a malfunction in the touch panel caused by such noise may be reduced, and the recognition ability of the touch sensor may be enhanced.

Therefore, when adding a touch panel function and a lens function to the display panel, the stereoscopic liquid crystal display device having a touch panel according to the present invention may resolve the problems caused by the parasitic capacitance of the electrodes, thereby enhancing the touch recognition rate when driving (or operating) the touch panel.

Also, by adding an electrically-driven liquid crystal lens and a touch panel, the stereoscopic liquid crystal display device having a touch panel according to the present invention may ground a second electrode being formed on an entire surface of an upper layer of the electrically-driven liquid crystal lens or may apply a voltage of 0V to the second electrode, thereby enhancing the touch recognition rate and also enhancing the realization of stereoscopic images.

And, depending upon application (or supply) of voltage for driving the electrically-driven liquid crystal lens, two-dimensional/three-dimensional (2D/3D) display switching may be realized. Whenever required, two-dimensional display and three-dimensional display switching may be enabled, and such switching is useful for various multi-player display or text display.

As described above, the stereoscopic liquid crystal display device having a touch panel and a method of manufacturing the same according to the present invention have the following advantages.

In addition to the touch panel, when forming a display device also realizing a stereoscopic image display at the same time, by grounding the electrode formed on an entire surface of an electrically-driven liquid crystal lens configured to display stereoscopic images, the operation of the touch panel may be separated from the operation of the electrically-driven liquid crystal lens and the display panel, which are formed below the touch panel, thereby preventing an electrical influence caused by a structure formed below the touch panel.

Accordingly, a touch detection may be performed without being influenced by the operation of the display panel or the electrically-driven liquid crystal lens. Thus, a touch may be recognized (or sensed) at an increased sensing rate without any malfunction, and the display of stereoscopic images may be realized.

And, depending upon application (or supply) of voltage for driving the electrically-driven liquid crystal lens, two-dimensional/three-dimensional (2D/3D) display switching may be realized. And, whenever required, two-dimensional display and three-dimensional display switching may be enabled, and such switching is useful for various multi-player display or text display.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic liquid crystal display device, comprising:
   a liquid crystal panel configured by including a first substrate and a second substrate facing into each other, a first liquid crystal layer filled between the first substrate and the second substrate, and a rear electrode formed on a surface of the second substrate, wherein the rear electrode is grounded;
   a first adhesion layer formed contacting the rear electrode; and an electrically-driven liquid crystal lens including a third substrate and a fourth substrate facing into each other and formed on the first adhesion layer, a second liquid crystal layer formed between the third substrate and the fourth substrate, a plurality of first electrodes formed on the third substrate, and a second electrode formed on an entire surface of a surface of the fourth substrate facing into the second liquid crystal layer and being grounded;

a second adhesion layer formed on a fourth substrate of the electrically-driven liquid crystal lens; and a touch panel including a fifth substrate on the second adhesion layer, and a first touch electrode and a second touch electrode formed on the fifth substrate, wherein the first touch electrode and the second touch electrode cross each another, wherein a noise occurring from the liquid crystal panel along with the realization of the electrically-driven liquid crystal lens is blocked, by grounding the second electrode.

2. The stereoscopic liquid crystal display device of claim 1, wherein the rear electrode, the first electrodes, the second electrode, the first touch electrode, and the second touch electrode are each formed of a transparent electrode.

3. The stereoscopic liquid crystal display device of claim 1, wherein a power voltage of 0V is applied to the second electrode.

4. The stereoscopic liquid crystal display device of claim 3, wherein different voltages are applied to the first electrodes within a predetermined pitch, so as to drive the electrically-driven liquid crystal lens with a lens, thereby performing a 3D display.

5. The stereoscopic liquid crystal display device of claim 3, wherein the first electrodes are floated or applied with the same power voltage or phase voltage, thereby performing a 2D display.

6. The stereoscopic liquid crystal display device of claim 1, wherein the second electrode contacts a structure enveloping and encasing the liquid crystal panel, the electrically-driven liquid crystal lens, and the touch panel, thereby being grounded.

7. The stereoscopic liquid crystal display device of claim 1, further comprising:
a cover glass on the touch panel.

8. A method of manufacturing a stereoscopic liquid crystal display device, comprising:

preparing a liquid crystal panel configured by including a first substrate and a second substrate facing into each other, a first liquid crystal layer filling a space between the first substrate and the second substrate, and a rear electrode formed on a surface of the second substrate, wherein the rear electrode is grounded;

preparing an electrically-driven liquid crystal lens including a third substrate and a fourth substrate facing into each other, a second liquid crystal layer formed between the third substrate and the fourth substrate, a plurality of first electrodes formed on the third substrate, and a second electrode formed on an entire surface of a surface of the fourth substrate facing into the second liquid crystal layer;

bonding the rear electrode of the liquid crystal panel and the third substrate of the electrically-driven liquid crystal lens with a first adhesion layer positioned between the second substrate and the third substrate;

preparing a touch panel including a fifth substrate, and a first touch electrode and a second touch electrode on the fifth substrate, wherein the first touch electrode and the second touch electrode cross over one another;

bonding the fourth substrate and the fifth substrate of the electrically-driven liquid crystal lens with a second adhesion layer positioned between the fourth substrate and the fifth substrate; and grounding the second electrode, wherein a noise occurring from the liquid crystal panel along with the realization of the electrically-driven liquid crystal lens is blocked, by grounding the second electrode.

9. The method of claim 8, further comprising:
forming a cover glass on the touch panel.

* * * * *